March 1, 1927.

P. D. IONIDES 1,619,616

ELECTRICALLY PROPELLED VEHICLE

Filed Dec. 24, 1925

INVENTOR
P. D. Ionides,
By Watson, Coit, Morse & Grindle.
ATTYS.

Patented Mar. 1, 1927.

1,619,616

UNITED STATES PATENT OFFICE.

PHILIP DENIS IONIDES, OF IPSWICH, ENGLAND, ASSIGNOR OF ONE-HALF TO RANSOMES & RAPIER LIMITED, OF IPSWICH, ENGLAND, A COMPANY OF GREAT BRITAIN.

ELECTRICALLY-PROPELLED VEHICLE.

Application filed December 24, 1925. Serial No. 77,671.

This invention relates to electrically propelled vehicles and has for its object to provide an improved driving and steering unit for such vehicles which will accommodate itself to irregularities in the surface over which it travels.

A further object is to provide a driving and steering unit having two wheels both driven from a common source of power in such a manner that each wheel is automatically supplied with that proportion of the available power which it requires so as to ensure a steady drive in spite of one of the wheels requiring greater power than the other at some times, for example when it meets an obstruction or when the vehicle is turning.

According to this invention the driving and steering unit comprises a frame supported on two wheels and carrying rigidly secured thereto two electric motors each of which drives one of the wheels. Adapted to connect this driving unit to the vehicle is a steering post the upper end of which is rotatably mounted in the vehicle frame while the lower end is so connected by a pivot to the frame of the driving unit that this unit can rock relatively to the steering post in a plane at right angles to the direction of travel of the driving unit. Preferably the two wheels are freely mounted on the ends of an axle rigidly secured to the driving unit frame and are adapted to be driven through spur or like gearing from the electric motors.

The electric motors are preferably series-wound so that if one wheel meets with increased resistance, as when the vehicle is turning in a circle or passing over broken ground, the supply of power to each wheel is automatically adjusted to the required extent.

The invention may be carried out in various ways but one construction of driving and steering unit according to this invention is illustrated by way of example in the accompanying drawings, in which—

Figure 1:
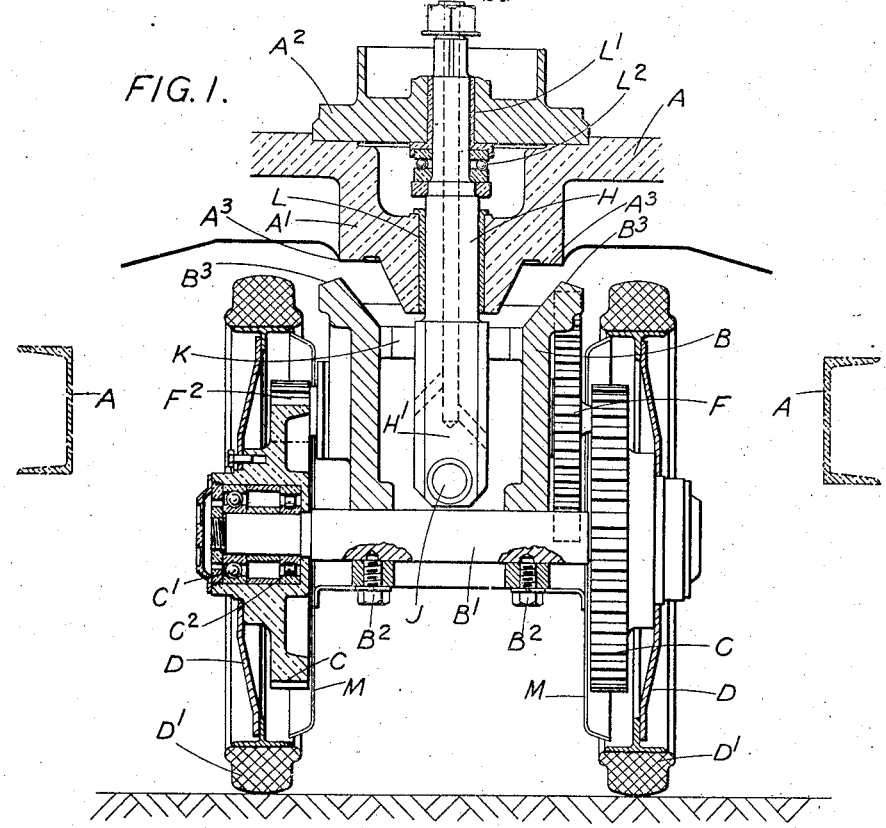
Figure 1 is a vertical section through the axes of the road wheels.
Figure 2:
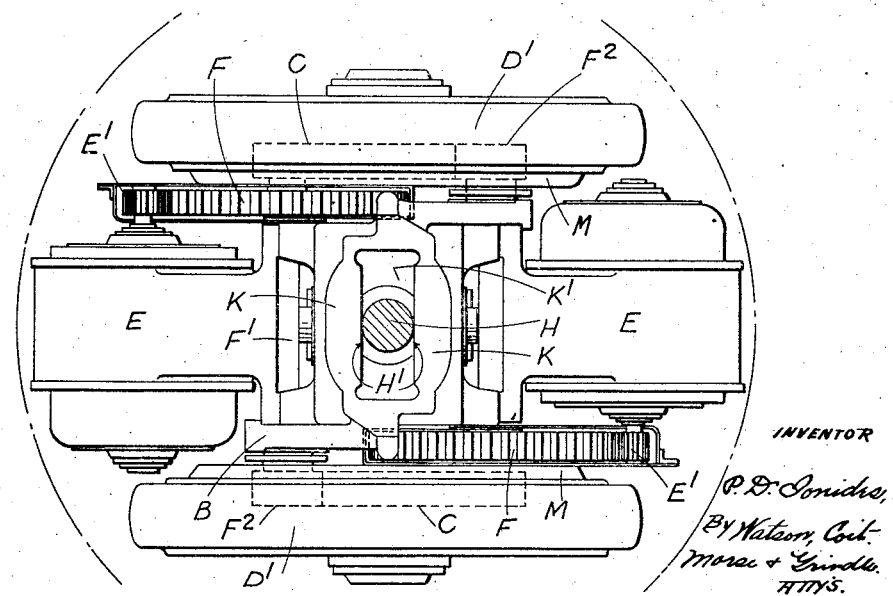
Figure 2 is a plan.

In the construction illustrated the driving and steering unit is adapted to support one end, for example the rear of a travelling crane or other vehicle the frame of which is shown at A.

The driving and steering unit comprises a frame or casting B carrying rigidly secured thereto an axle $B^1$ which is retained in position and locked against rotation by two set screws $B^2$. Rotatably mounted on each end of the axle $B^1$ is a gear wheel C, these gear wheels being supported on ball bearings $C^1$ and roller bearings $C^2$. Each of the gear wheels C has a road wheel D bolted thereto as shown, these road wheels being provided with rubber or like treads $D^1$.

Rigidly mounted on each end of the frame D is an electric motor E, preferably of the series-wound type. Each of these motors has rigidly secured to the end of its shaft a pinion $E^1$ which meshes with a relatively large gear wheel F mounted on one end of a shaft $F^1$ carried in bearings in and extending across the frame B. To the other end of each shaft $F^1$ is rigidly secured a second relatively small gear wheel $F^2$ and these gear wheels $F^2$ mesh with the gear wheels C carrying the road wheels D. Thus it will be seen that each of the electric motors E drives one of the road wheels through a train of reduction gearing.

Connecting the frame B of the driving and steering unit to the vehicle frame A is a substantially vertical steering post H the lower end of which is connected to the frame B by a longitudinal pivot J in such a manner that the frame B can rock relatively to the steering post H in a plane at right angles to the direction of travel of the driving unit. In order to prevent undue stress being placed upon the steering post and the pivot J when the driving unit is in operation, the post H is conveniently provided with flats $H^1$ which engage the side walls K of a slot $K^1$ formed in the upper portion of the frame B and through which the post H passes, the arrangement being such that the slot acts as a guide for the post which permits the desired rocking of the driving unit relatively to this post and acts as a thrust member taking part of the stresses set up by the driving force.

The upper end of the steering post H is rotatably mounted in bearings L and $L^1$ formed respectively in a circular boss $A^1$ on the vehicle frame A and in a disc-like member $A^2$ secured to the vehicle frame as shown. Thrust bearings $L^2$ are also provided to transmit the weight of the vehicle to the post H. The upper end of the steering post H is adapted to have a gear or worm wheel secured thereto by means of which the post and hence the driving unit can be turned relatively to the vehicle frame for the purpose of steering.

Shoulders are preferably provided on the driving unit frame and on the vehicle frame as shown respectively at B³ and A³, these shoulders being adapted to come in contact with one another if the driving unit tilts beyond a certain angle relatively to the vehicle, thus reducing risk of straining the steering post H and also preventing the road wheels coming into contact with some part of the vehicle or vehicle frame, due to an excessive tilt of the driving unit. Guards or covers M are conveniently provided to enclose the gear wheels C and F² and thus protect them from dirt or water when the vehicle is in use.

The electric motors may be supplied with current from some convenient source, for example from a dynamo-electric generator mounted on the vehicle and driven by an internal combustion engine, the speed of which is varied to control the speed of the electric motors.

A driving and steering unit according to this invention may be applied to various types of vehicle but is particularly applicable to vehicles such as travelling cranes, concrete mixing machines or excavators which have to travel over broken ground and turn in a small space.

It is to be understood that the details of construction may be varied to suit the particular purpose for which the driving and steering unit is intended and the vehicle with which it is to be used without departing from this invention.

In the appended claims the term "front and rear faces" of the tilting block is intended to indicate those faces of the block which lie in planes parallel to the longitudinal axis of the dead axle.

What I claim as my invention and desire to secure by Letters Patent is:—

1. A driving and steering unit for an electrically propelled vehicle comprising a vertical steering post adapted to be mounted to rotate in the vehicle frame, a tilting block, a pivot so connecting the tilting block to the steering post that this block can rock about an axis at right angles to the axis of rotation of the steering post, a short dead axle extending across and rigidly carried by the tilting block, a road wheel freely mounted at each end of the axle, two electric motors mounted respectively on the front and rear faces of the tilting block and transmission mechanism whereby one of these motors is caused to drive each road wheel.

2. A driving and steering unit for an electrically propelled vehicle comprising a vertical steering post adapted to be mounted to rotate in the vehicle frame, a tilting block, a pivot so connecting the tilting block to the steering post that this block can rock about an axis at right angles to the axis of rotation of the steering post, a short dead axle extending across and rigidly carried by the tilting block, a road wheel freely mounted at each end of the axle, two series-wound electric motors mounted respectively on the front and rear faces of the tilting block, and spur gearing connecting each of these motors to one of the road wheels.

In testimony whereof I have signed my name to this specification.

PHILIP DENIS IONIDES.